United States Patent
Jain

(10) Patent No.: US 9,471,345 B2
(45) Date of Patent: Oct. 18, 2016

(54) RUNTIME GENERATION AND INJECTION OF JAVA ANNOTATIONS

(71) Applicant: Shashank Mohan Jain, Bangalore (IN)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 122 days.

(21) Appl. No.: 14/036,041

(22) Filed: Sep. 25, 2013

(65) Prior Publication Data
US 2015/0089474 A1    Mar. 26, 2015

(51) Int. Cl.
*G06F 9/44*    (2006.01)
*G06F 9/455*    (2006.01)

(52) U.S. Cl.
CPC ................... *G06F 9/45525* (2013.01)

(58) Field of Classification Search
CPC .......... G06F 11/3466; G06F 9/45525
USPC .......................................... 717/130
See application file for complete search history.

(56) References Cited

U.S. PATENT DOCUMENTS

| | | | |
|---|---|---|---|
| 7,467,149 B2 * | 12/2008 | Gaurav et al. | |
| 7,509,638 B2 * | 3/2009 | Backhouse et al. | 717/177 |
| 7,644,050 B2 | 1/2010 | Berg et al. | |
| 7,707,544 B2 | 4/2010 | Beust et al. | |
| 7,707,564 B2 | 4/2010 | Marvin et al. | |
| 7,966,602 B1 | 6/2011 | Webster et al. | |
| 8,005,871 B2 | 8/2011 | Marvin et al. | |
| 8,060,858 B2 * | 11/2011 | Mitrov et al. | 717/107 |
| 8,214,811 B2 * | 7/2012 | Barcia et al. | 717/148 |
| 8,869,140 B2 * | 10/2014 | Todorova | 717/175 |
| 8,972,942 B2 * | 3/2015 | Gu | G06F 11/3684 717/124 |
| 2004/0111701 A1 * | 6/2004 | Beust | 717/108 |
| 2005/0262499 A1 | 11/2005 | Read et al. | |
| 2008/0163270 A1 * | 7/2008 | Mitrov et al. | 719/331 |
| 2009/0089785 A1 * | 4/2009 | Marwinski et al. | 718/102 |
| 2009/0282401 A1 * | 11/2009 | Todorova | 717/175 |
| 2009/0282414 A1 * | 11/2009 | Branda et al. | 718/103 |
| 2012/0159460 A1 | 6/2012 | Haug et al. | |
| 2012/0185821 A1 | 7/2012 | Yaseen et al. | |
| 2012/0233593 A1 * | 9/2012 | Sahoo | G06F 9/465 717/120 |
| 2012/0246316 A1 * | 9/2012 | Ramu et al. | 709/226 |
| 2013/0042152 A1 * | 2/2013 | Fryc et al. | 714/38.1 |
| 2014/0165029 A1 * | 6/2014 | Balasubramanian et al. | 717/110 |
| 2015/0089474 A1 * | 3/2015 | Jain | G06F 9/45525 717/121 |

OTHER PUBLICATIONS

Holy, Practical introduction into Code Injection with AspectJ, Javassist, and Java Proxy, The Holy Java (Sep. 7, 2011) retrieved from https://theholyjava.wordpress.com/2011/09/07/practical-introduction-into-code-injection-with-aspectj-javassist-and-java-proxy/ on Sep. 4, 2015.*

(Continued)

*Primary Examiner* — Jason Mitchell
*Assistant Examiner* — Theodore Hebert

(57) ABSTRACT

An annotation generator utility is implemented. The annotation generator utility reads, from a properties file, configurations of a Java component. The annotation generator utility generates annotations corresponding to the configurations. The annotation generator utility injects the annotations into compiled source code of the Java component. In one aspect, the annotations are injected into compiled source code of the Java component at build time. In another aspect, the annotations are injected into compiled source code of the Java component at runtime.

17 Claims, 6 Drawing Sheets

(56) References Cited

OTHER PUBLICATIONS

Abbassi, How to add Annotations at Runtime to a java class method using Javassist, ayoubelabbassi.blogspot.com (Jan. 3, 2011) retrieved from http://ayoubelabbassi.blogspot.com/2011/01/how-to-add-annotations-at-runtime-to.html on Mar. 22, 2015.*

Howlett et al., Spring App Migration: From XML to Java-based Config, robinhowlett.com (Feb. 13, 2013) retrieved from http://www.robinhowlett.com/blog/2013/02/13/spring-app-migration-from-xml-to-java-based-config/ on Mar. 22, 2015.*

Practical introduction into Code Injection with AspectJ, Javassist, and Java Proxy, The Holy Java (Sep. 7, 2011) retrieved from https://theholyjava.wordpress.com/2011/09/07/practical-introduction-into-code-injection-with-aspectj-javassist-and-java-proxy/ on Jan. 8, 2016.*

How to add Annotations at Runtime to a java class method using Javassist, ayoubelabbassi.blogspot.com (Jan. 3, 2011) retrieved from http://ayoubelabbassi.blogspot.com/2011/01/how-to-add-annotations-at-runtime-to.html on Mar. 22, 2015.*

Whitehead, Java Run-Time Monitoring, Part 2: Postcompilation Instrumentation and Performance Monitoring Interception, Class Wrapping, and Bytecode Instrumentation, IBM Developer Works (Aug. 5, 2008) retrieved from http://www.ibm.com/developerworks/library/j-rtm2/j-rtm2-pdf.pdf on Jan. 8, 2016.*

Francisco Curbera, Donald Ferguson, Martin Nally, Marcia L. Stockton; Toward a Programming Model for Service-Oriented Computing; Service-Oriented Computing—ICSOC; 2005; p. 33-47; Springer Berlin Heidelberg; Germany.

* cited by examiner

RUNTIME GENERATION AND INJECTION OF JAVA ANNOTATIONS

BACKGROUND

In Java, a deployment descriptor is a configuration file for an artifact that is to be deployed, for example, to a container. The deployment descriptor may be an Extensible Markup Language (XML) document that describes the deployment settings of an application, a module, or a component. The deployment settings may be specific container options, security settings, configuration requirements, etc. At runtime, a Java server reads the deployment descriptor and acts upon the application, module, or component accordingly. Typically, Java components are compiled and packaged into one or more units for deployment, e.g., Java archive file (JAR), enterprise archive file (EAR), web archive file (WAR), etc. The package may include the compiled source code of the component and the deployment descriptor. Because deployment descriptor specifies metadata information as a file external to the respective compiled source code of the component, it can be changed without the need to modify the source code of the component. Nevertheless, to change the metadata information specified by the deployment descriptor, the package containing the deployment descriptor and the component needs to be unpackaged and repackaged after the deployment descriptor is modified.

Deployment descriptors may generate boilerplate code that may be redundant. In an effort to minimize boilerplate code, annotations are introduced in later versions of the Java Platform Enterprise Edition (e.g., Java EE 5). One advantage of annotations is that they reduce the amount of code a developer needs to write. Annotations provide a mechanism for associating Java classes, interfaces, fields, methods, etc., with metadata information. Annotations are considered, among other things, as an alternative to deployment descriptors required by earlier versions of Java EE or the Java Platform, Standard Edition (Java SE). As opposed to deployment descriptors, annotations maintain the metadata information as part of the program itself, e.g., as part of the source code of the component. For example, annotations may be included into the source code of a Java class to specify configurations of the Java class required at run time. Annotations, to be included into the deployment package, are compiled as part of the source code of the respective component. To modify the compiled annotations a possession of the source code is required to change to source code itself. In case where a customer of a software provider would desire to customize configurations, the consumer needs to either possess the source code (which is rare), or request the desired modification from the software provider. In any case, to modify annotations, the source code of the component needs to be modified, then recompiled (or rebuild), repackaged and redeployed. Such approach might be cumbersome, time consuming, and less scalable. Furthermore, because the aforementioned actions require a recompilation to modify the annotations, the approach is not performed dynamically, e.g., during runtime of the component.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for runtime generation and injection of Java annotations are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Nowadays, in the Java computer programming model, configurations are often implemented using annotations. Annotations are metadata that can be added to Java source code. Configurations of Java components, applications, or modules can be implemented via annotations. Examples of Java applications, modules or components include, but are not limited to, servlets, web applications, web containers, application clients or applets, JavaServer Faces, JavaServer Pages (JSPs), Enterprise JavaBeans (EJBs) such as message-driven beans, etc. Elements of Java components that may be annotated include, but are not limited to, Java classes, methods, interfaces, variables, constructors, fields, parameters, packages, etc. Examples of annotations include, but are not limited to, Java Specification Request 250 (JSR 250) and JSR175. Java annotations can be reflective in that they can be embedded in class files generated by the compiler. Further, annotations may be retained by the Java Virtual Machine (VM) to be made retrievable at runtime.

Figure 1:
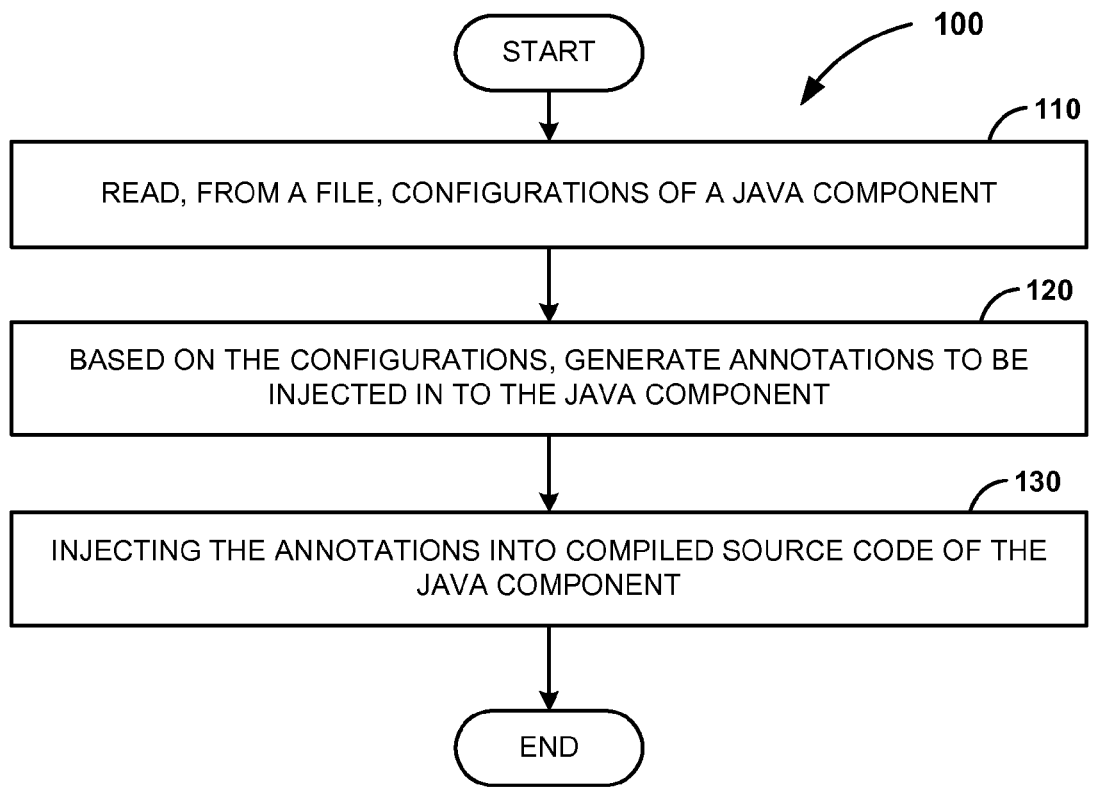
FIG. 1 is a flow diagram illustrating a process to generate and inject Java annotations, according to one embodiment.

FIG. 1 illustrates process 100 to generate and inject Java annotations, according to one embodiment. Process 100 starts at 110 by reading, from a file, configurations of a Java component. For example, if the Java component is a message-driven bean, configurations may specify a message provider that provides messages to the bean and a queue that delivers the messages to the bean. Another example may be security configurations that specify roles or users granted permissions to, for example, execute the Java component. In one embodiment, the configurations may be specified into a properties file. The configurations may specify metadata about the Java component but may not be part of the program logic itself. The configurations may be specified into the properties file by a consumer or a provider of the Java component. The configurations may be represented as key-value pairs. For example, in the case of the message-driven bean, a key may be a "provider name" and a value may be the specific name of the message provider, e.g., "Citi". Thus, in the properties file it is specified "Provider Name=Citi".

At 120, annotations are generated based on the configurations. The generated annotations correspond to the configurations that are read. In one embodiment, the configurations may be generated using instrumentation libraries or bytecode manipulation libraries such as Java Programming Assistant (Javassist) and Code Generation Library (cglib). In one embodiment, the properties file is read, and for each key-value pair corresponding annotation is generated.

At 130, the annotations are automatically injected into compiled source code of the Java component. For example, the annotations may be injected into bytecode of a class file representing the Java component. Annotations may also be injected into object code of a component. One advantage is that annotations may be added or modified without the possession of the original source code of the Java component. Thus, the original source code is not needed to add or modify configurations of a component. Further, the original source code itself is not modified. The source code of the Java component that may be in the process of operation remains unchanged. Another advantage is that annotations may be added or modified dynamically, during runtime. Also, annotations may be injected without the need of recompilation of the Java component. Thus, configurations may be changed on the fly.

In one embodiment, the Java component may be without annotations. In such case, annotations are generated and added to the Java component. Alternatively, the Java component may originally be annotated. In such case, modified annotations may be generated, the original annotations may be deleted and new, modified annotations may be added or inserted.

Figure 2:
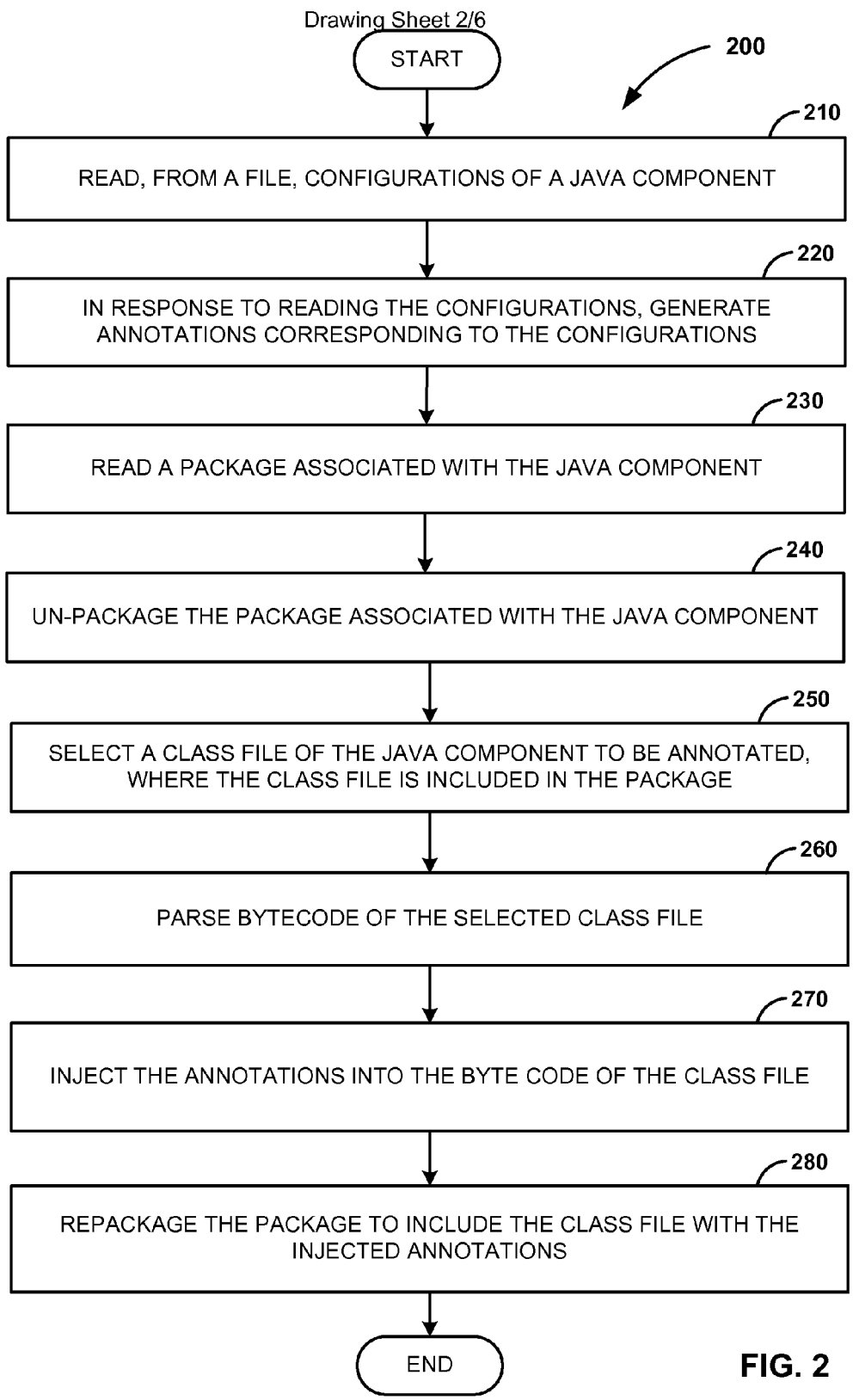
FIG. 2 is a flow diagram illustrating a process to inject Java annotations at build time of a Java component, according to one embodiment.

FIG. 2 illustrates process 200 to inject Java annotations at build time of a Java component, according to one embodiment. At 210, configurations of a Java component are read from a file. In response to reading the configurations, at 220, annotations corresponding to the configurations are generated. Once the annotations are generated, at 230, a package associated with the Java component is read. For example, the package may be a Java base artifact such as JAR, WAR, EAR, etc., that represents the Java component. The package may include one or more class files of the Java component. At 240, the package is un-packaged, for example, via an unzip operation. At 250, a class file of the Java component may be selected to be annotated, where the class file is included in the package. In one embodiment, more than one class files may be selected to be annotated. At 260, bytecode of the selected class file is parsed or read. At 270, the annotations are injected into the bytecode of the class file. The original source code of the Java component remains unchanged by the injected annotations. At 280, the package is repackaged to include the class file with the injected annotations.

Figure 3:
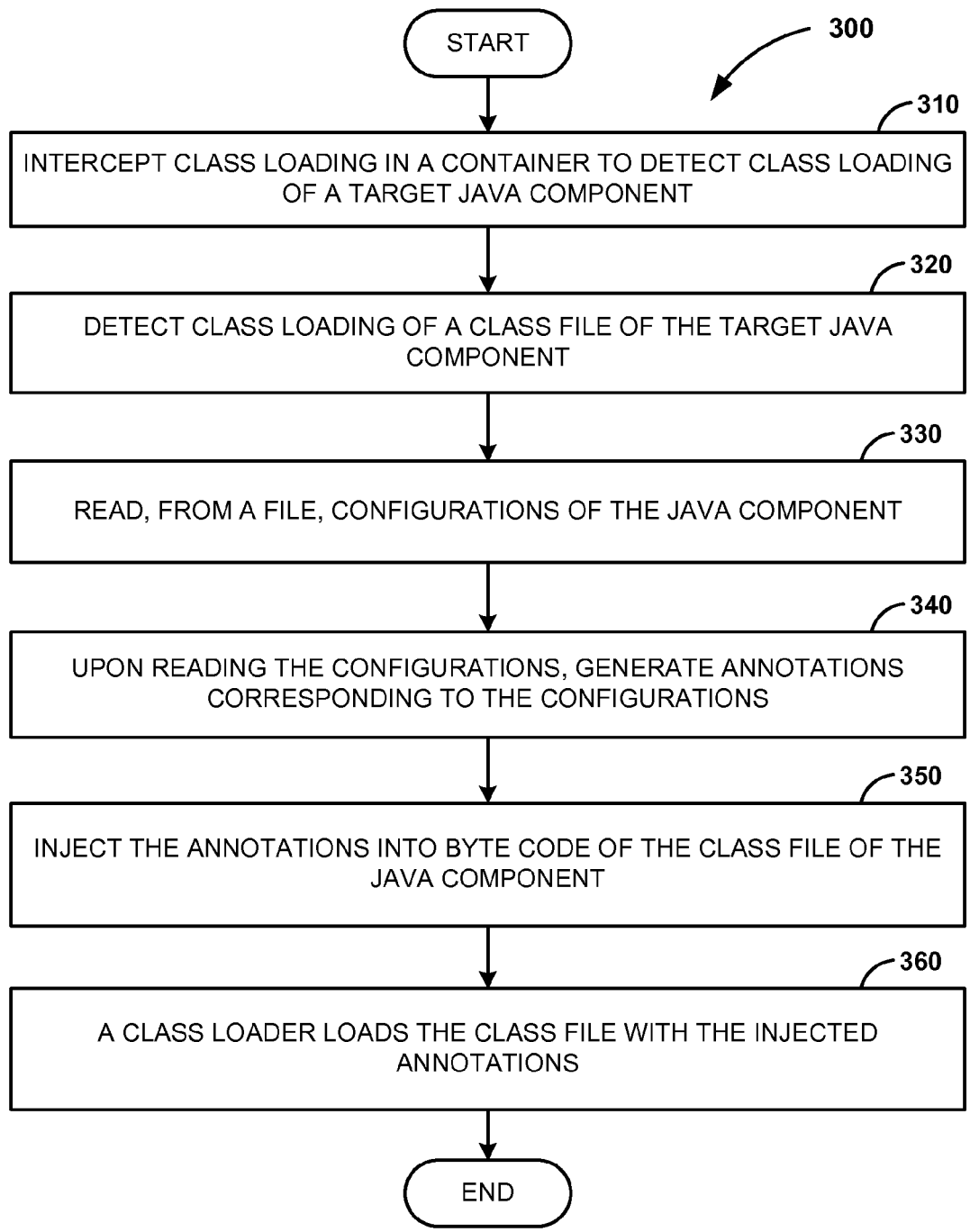
FIG. 3 is a flow diagram illustrating a process to generate and inject Java annotations at runtime during class loading, according to one embodiment.

FIG. 3 illustrates process 300 to generate and inject Java annotations at runtime during class loading, according to one embodiment. At 310, class loading in a container is intercepted to detect class loading of a target Java component. Examples of containers may include, but are not limited to, a web container or a servlet container (e.g., Apache Tomcat), and an EJB container. In one embodiment, an agent program intercepts or listens in class loading processes that occur within the container. At 320, class loading of a class file of the target Java component is detected.

Upon detecting class loading of the class file of the Java component, at 330, configurations of the Java component are read from a file. At 340, upon reading the configurations, annotations corresponding to the configurations are generated. At 350, the annotations are injected into byte code of the class file of the Java component. The annotations are injected at runtime during class loading of the class file of the Java component. The annotations may be injected while the Java component is operating. At 360, the class file with the injected annotations is loaded by a class loader, e.g., the class file may be loaded by Java Classloader.

Figure 4:
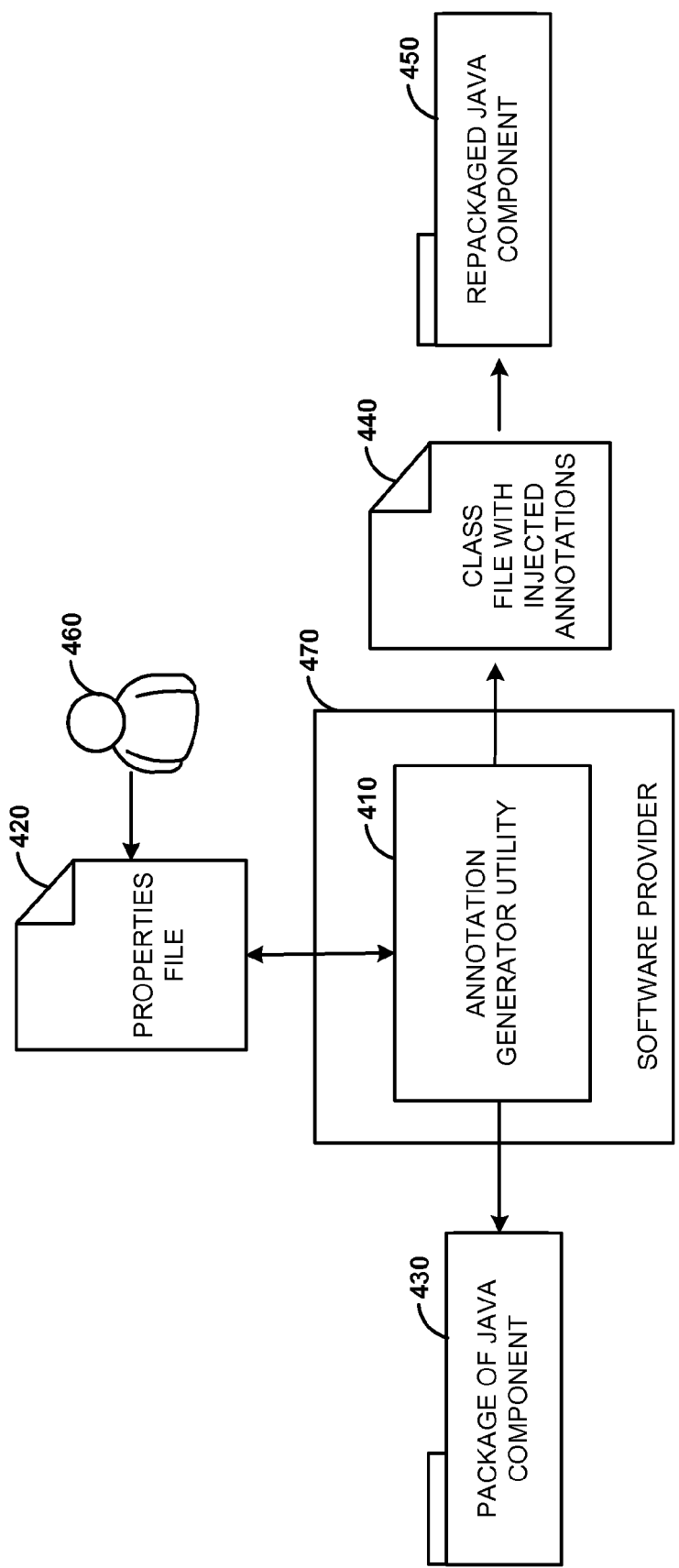
FIG. 4 is a block diagram illustrating an annotation generator utility to generate and inject Java annotations to a Java component, according to one embodiment.

FIG. 4 illustrates annotation generator utility 410 to generate and inject Java annotations to a Java component, according to one embodiment. Annotation generator utility 410 may be provided by software provider 470. Package of Java component 430 may also be developed and provided by software provider 470. Software provider 470 may provide package of Java component 430 to consumer 460 for consumption. In one embodiment, consumer 460 may be a customer of software provider 470. In another embodiment, consumer 460 may be an entity that is related to the software provider 470. The consumer 460 may be the software provider 470, according to one embodiment. Consumer 460 may consume the Java component provided by software provider 470 without having access to or possessing original source code of the Java component. Consumer 460 may desire to modify security settings, container configurations, or other configurations. In one embodiment, instead of requesting changes to be made by software provider 470, consumer 460 may enter desired configurations into properties file 420. Once configurations are entered, consumer 460 may send properties file 420 to annotation generator utility 410 to be read and processed by annotation generator utility 410. Once triggered, annotation generator utility 410 reads properties file 420. Annotation generator utility 410 reads the configurations specified in properties file 420 and generates annotations that correspond to the specified configurations. Upon reading properties file 420 and generating the annotations, annotation generator utility 410 parses and un-packages package of Java component 430. Package of Java component 430 includes one or more class files representing compiled source code of the Java component. Annotation generator utility 410 selects a class file from package of Java component 430 to be annotated. Annotation generator utility 410 injects annotations into the selected class file to generate class file with injected annotations 440. Once class file with injected annotations 440 is generated, annotation generator utility 410 repackages and includes class file with injected annotations 440 into repackaged Java component 450. Because annotations are directly injected into compiled source code of a Java component, annotations are created or modified without a recompilation step of the Java component.

Table 1 below illustrates a sample code that reads configurations from a properties file, generates annotations based on the configurations, and injects the generated annotations into a class file of Java component.

TABLE 1

Sample code of Annotation Generator Utility

AnnotationsAttribute attr = new AnnotationsAttribute(constpool,
AnnotationsAttribute.visibleTag;
    Annotation annot = new Annotation("MyAnnotation", constpool);
    annot.addMemberValue("value", new
IntegerMemberValue(ccFile.getConstPool( ), 0));
    attr.addAnnotation(annot);
    ccFile.addAttribute(attr);

In one embodiment, a key "MyAnnotation" is specified in properties file 420. Annotation generator utility 410 reads corresponding value of the key "MyAnnotation" from properties file 420 and injects or adds the respective value as annotation to "ccFile" that represents a Java class file of the Java component (as illustrated in Table 1). Sample code illustrated in Table 1 may be executed by annotation generator utility 410.

Consumer 460 can change and create configurations dynamically and automatically without the need to request desired changes from software provider 470. For example, in case of a message-driven bean where one component connects to a particular queue and provider, consumer 460 may desire to scale out and have components listening to different queues. Using annotation generator utility 410, consumer 460 may modify or create configurations unilaterally and automatically. For example, a customer may customize one Java component to listen to different queues for different scenarios. The same Java component may be customized using an annotation generator utility 410 by various customers as determined by their respective requirements. Alternatively, the Java component may be customized using an annotation generator utility 410 by software provider 470 for various consumers or customers. Further, consumer 460 does not need to possess the source code of the Java component to change the configurations as the original source code remains unchanged while only the compiled source code is modified by the injected annotations.

Figure 5:
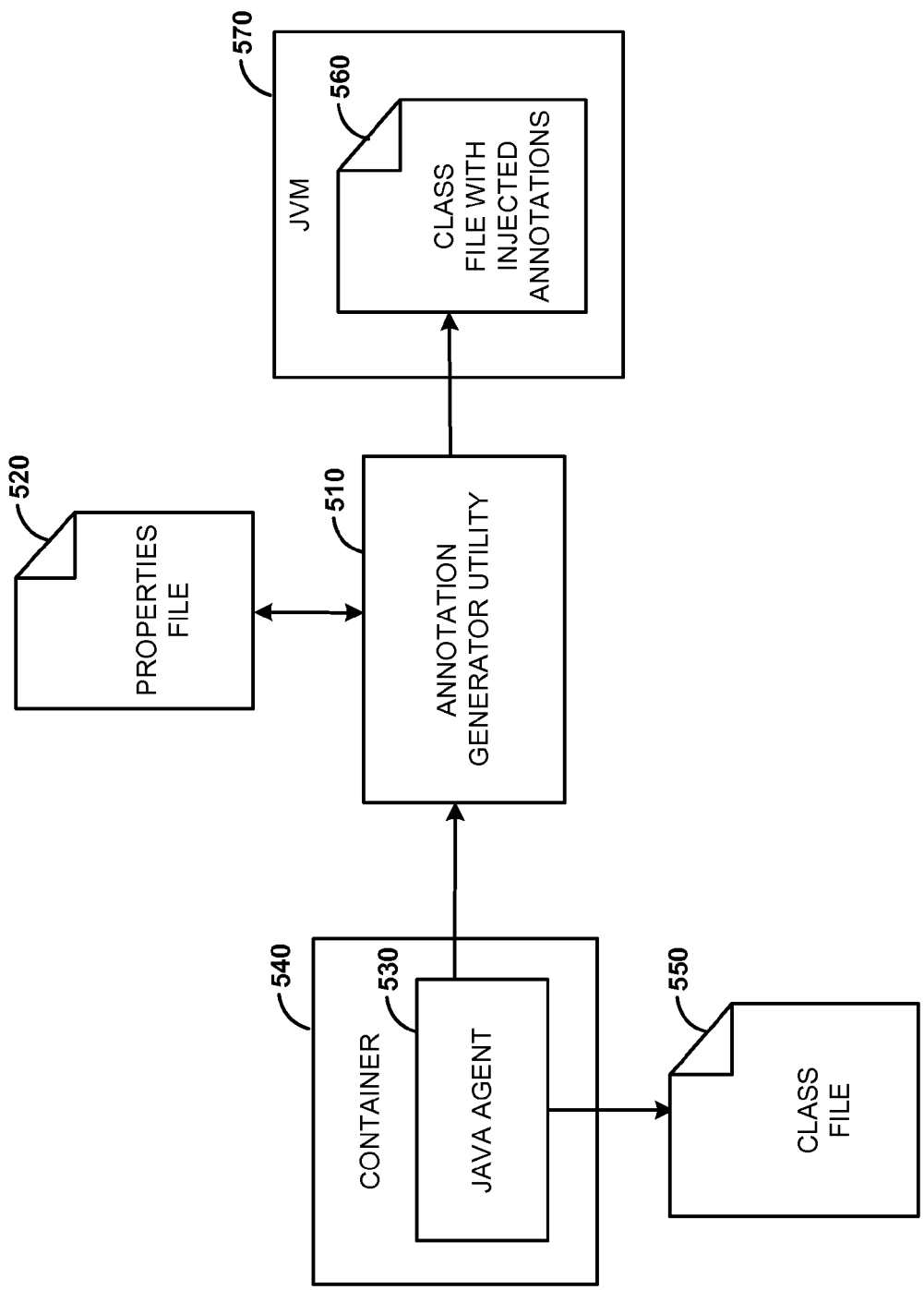
FIG. 5 is a block diagram illustrating an annotation generator utility to generate and inject Java at runtime during class loading of a Java component, according to one embodiment.

FIG. 5 illustrates an annotation generator utility 510 to generate and inject Java at runtime during class loading of a Java component, according to one embodiment. Container 540 may provide an execution environment for Java components. In one embodiment, Java agent 530 may be running or operating in container 540 to intercept class loading in container 540. Java agent 530 may intercept class loading in container 540 to detect class loading of a target Java component. Upon detecting class loading of class file 550 of the target Java component, Java agent 530 invokes annotation generator utility 510. Once invoked, annotation generator utility 510 reads configurations from properties file 520. Upon reading the configurations, annotation generator utility 510 generates annotations corresponding to the configurations. Annotation generator utility 510 injects the generated annotations into byte code of class file 550 to generate class file with injected annotations 560. A class loader loads class file with injected annotations 560 into Java Virtual Machine 570 (JVM 570).

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
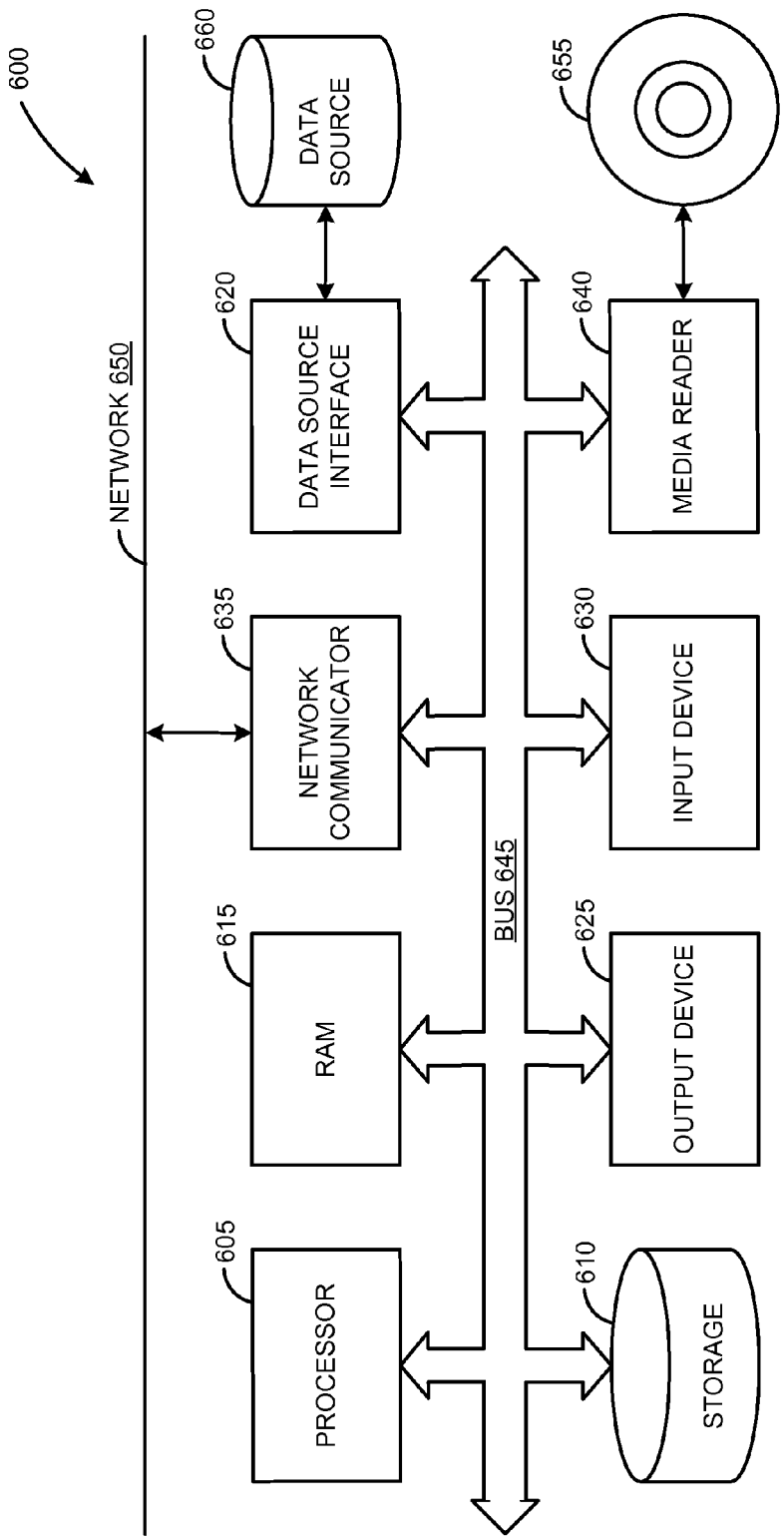
FIG. 6 is a block diagram illustrating an exemplary computer system.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method, the method comprising:
   reading, from a file stored in a memory, configurations of a Java component,
   based on the configurations, generating annotations to be injected into the Java component, and
   at runtime:
      a processor injecting the annotations into a compiled source code of the Java component, while original source code of the Java component remains unchanged by the injected annotations, wherein injecting the annotations into the compiled source code of the Java component comprises:
         intercepting a class loading process in a container;
         detecting class loading of a class file of the java component;
         injecting the annotations into the class file of the Java component;
      dynamically updating the configurations corresponding to the compiled source code of the Java component while the original source code of the Java component remains unchanged; and
      based on the updated configurations, dynamically modifying the annotations to be injected into the compiled source code of the Java component without recompiling the Java component.

2. The method of claim 1, further comprising:
   at runtime:
      un-packaging a package associated with the Java component;
      parsing byte code of the class file of the Java component, wherein the class file is included in the package;
      injecting the annotations into the byte code of the class file of the Java component; and
      repackaging the package by including the class file with the injected annotations.

3. The method of claim 1, further comprising:
   a class loader loading the class file with the injected annotations.

4. The method of claim 1, further comprising:
   specifying the configurations into the file by a consumer of a software provider of the Java component, and
   the consumer unilaterally and automatically applying the configurations by sending the file for processing to an annotation generator utility provided by the software provider.

5. The method of claim 1, wherein generating the annotations to be injected into the Java component further comprises:
   when the java component is originally without annotations, generating and injecting new annotations that correspond to the configurations.

6. The method of claim 1, wherein generating annotations to be injected into the Java component further comprises:
   when the java component is originally with annotations, generating and injecting modified annotations that correspond to the configurations.

7. A computer system, the system comprising:
   a processor, and
   a memory in communication with the processor, the memory comprising:
      a Java component;

a properties file including configurations of the Java component;
an annotation generator utility to:
read, from the properties file the configurations of the Java component,
upon reading the configurations, generate corresponding annotations to be injected into the Java component, and
at runtime;
inject the annotations into a compiled source code of the Java component, while original source code of the Java component remains unchanged by the injected annotations, wherein injecting the annotations into the compiled source code of the Java component comprises:
intercept a class lading process in a container;
detect class loading of a class file of the Java component;
inject the annotations in the class file of the Java component;
dynamically update the configurations corresponding to the compiled source code of the Java component while the original source code of the Java component remains unchanged; and
based on the dynamically updated configurations, dynamically modify the annotations to be injected into the compiled source code of the Java component without recompiling the Java component.

8. The computer system of claim 7 further to:
at runtime:
un-package a package associated with the Java component;
parse byte code of the class file of the Java component, wherein the class file is included in the package;
inject the annotations into the byte code of the class file of the Java component; and
repackage the package by including the class file with the injected annotations.

9. The computer system of claim 7 further to:
load the class file with the injected annotations by a class loader.

10. The computer system of claim 7 further to:
specify the configurations into the file by a consumer of a software provider of the Java component, and
the consumer unilaterally and automatically apply the configurations by sending the file for processing to an annotation generator utility provided by the software provider.

11. The computer system of claim 7 further to:
when the java component is originally without annotations, generating and injecting new annotations that correspond to the configurations, and
when the java component is originally with annotations, generating and injecting modified annotations that correspond to the configurations.

12. A non-transitory computer readable medium storing instructions thereon, which when executed by a processor cause a computer system to:
read, from a file stored in a memory, configurations of a Java component,
based on the configurations, generate annotations to be injected into the Java component, and
at runtime:
inject the annotations into a compiled source code of the Java component, while original source code of the Java component remains unchanged by the injected annotations, wherein injecting the annotations into the compiled source code of the Java component comprises:
intercepting a class loading process in a container;
detecting class loading of a class file of the java component;
injecting the annotations into the class file of the Java component; and
dynamically update the configurations corresponding to the compiled source code of the Java component while the original source code of the Java component remains unchanged; and
based on the dynamically updated configurations, dynamically modify the annotations to be injected into the compiled source code of the Java component without recompiling the Java component.

13. The computer readable medium of claim 12, wherein the instructions when executed by the processor cause the computer system to:
at runtime:
un-packaging a package associated with the Java component;
parsing byte code of the class file of the Java component, wherein the class file is included in the package;
injecting the annotations into the byte code of the class file of the Java component; and
repackaging the package by including the class file with the injected annotations.

14. The computer readable medium of claim 12, wherein the instructions when executed by the processor cause the computer system to:
a class loader loading the class file with the injected annotations.

15. The computer readable medium of claim 12, wherein the instructions when executed by the processor cause the computer system to:
specifying the configurations into the file by a consumer of a software provider of the Java component, and
the consumer unilaterally and automatically applying the configurations by sending the file to an annotation generator utility provided by the software provider.

16. The computer readable medium of claim 12, wherein the instructions when executed by the processor cause the computer system to:
when the java component is originally without annotations, generating and injecting new annotations that correspond to the configurations.

17. The computer readable medium of claim 12, wherein the instructions when executed by the processor cause the computer system to:
when the java component is originally with annotations, generating and injecting modified annotations that correspond to the configurations.

* * * * *